United States Patent
Takahashi et al.

(10) Patent No.: US 7,495,192 B2
(45) Date of Patent: Feb. 24, 2009

(54) ARC WELDING ROBOT SYSTEM HAVING ARC WELDING APPARATUS

(75) Inventors: Hiromitsu Takahashi, Minamitsuru-gun (JP); Toshihiko Inoue, Fujiyoshida (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 0 days.

(21) Appl. No.: 11/332,230

(22) Filed: Jan. 17, 2006

(65) Prior Publication Data

US 2006/0163225 A1 Jul. 27, 2006

(30) Foreign Application Priority Data

Jan. 18, 2005 (JP) .............................. 2005-010204

(51) Int. Cl.
*B23K 9/12* (2006.01)
(52) U.S. Cl. .................................. 219/125.1; 219/137.2
(58) Field of Classification Search ............... 219/125.1, 219/137.9, 137.2, 137.7; 901/42
See application file for complete search history.

(56) References Cited

U.S. PATENT DOCUMENTS

| | | | | |
|---|---|---|---|---|
| 3,694,620 A | * | 9/1972 | Gleason | .................. 219/137.7 |
| 6,066,833 A | * | 5/2000 | Rigdon et al. | ............ 219/137.2 |
| 7,105,771 B2 | * | 9/2006 | Inoue et al. | ............... 219/125.1 |

FOREIGN PATENT DOCUMENTS

| | | | | |
|---|---|---|---|---|
| JP | 01170593 | | | 7/1989 |
| JP | 1-233067 | A | * | 9/1989 |
| JP | 2-59177 | | * | 2/1990 |
| JP | 02059177 | | | 2/1990 |
| JP | 2001300729 | | | 10/2000 |
| JP | 2003-103370 | A | * | 4/2003 |
| JP | 2003103370 | | | 4/2003 |
| JP | 2004-223576 | | | 8/2004 |

* cited by examiner

*Primary Examiner*—Kevin P Kerns
(74) *Attorney, Agent, or Firm*—Drinker Biddle & Reath LLP

(57) ABSTRACT

An arc welding apparatus includes a single-electrode type welding torch, a single wire feeder supplied with a plurality of welding wires and having a plurality of wire drivers for driving the plurality of welding wires, and a welding controller for controlling operations of the welding torch and the wire feeder. The welding controller selectively operates any one of the plurality of wire drivers to feed only a single welding wire to the welding torch and performs the arc welding. An arc welding robot system includes the arc welding apparatus, a robot mechanical part for holding the welding torch of the arc welding apparatus, and a robot controller for controlling operation of the robot mechanical part.

14 Claims, 8 Drawing Sheets

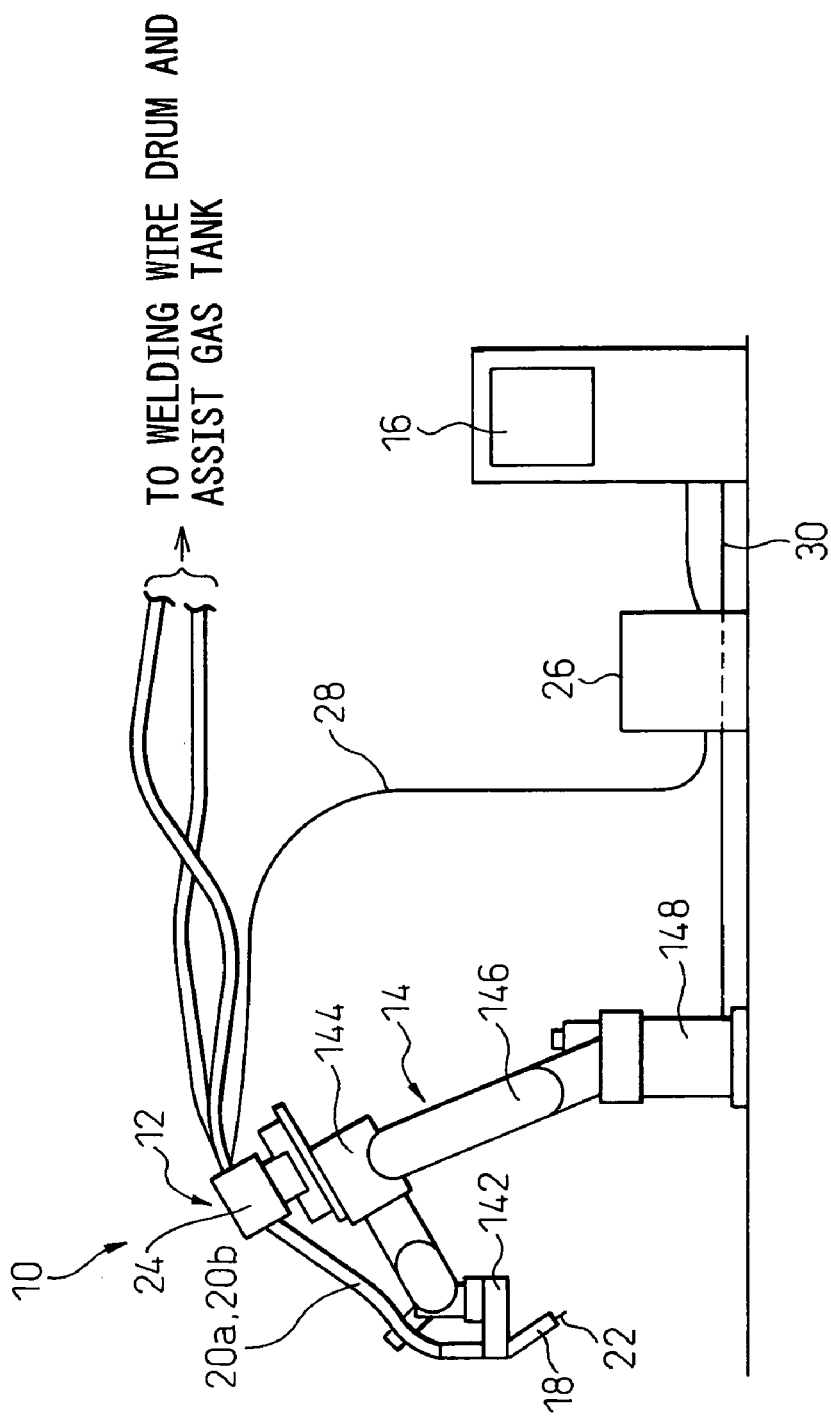
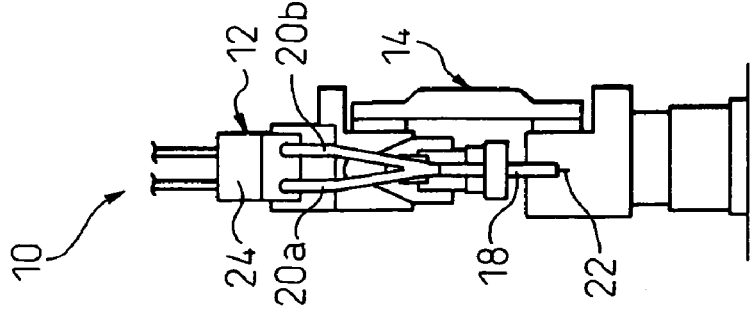

ARC WELDING ROBOT SYSTEM HAVING ARC WELDING APPARATUS

BACKGROUND OF THE INVENTION

1. Field of the Invention

The present invention relates to an arc welding apparatus, and more particularly to an arc welding robot and an arc welding robot system including an arc welding apparatus.

2. Description of the Related Art

A conventional arc welding apparatus 200, for example, as shown in FIGS. 12A and 12B, includes a multi-electrode type welding torch 202, a first wire feeder 204a and second wire feeder 204b, and a first torch cable 206a and second torch cable 206b, all of which are mounted on a robot mechanical part 208. The welding torch 202 is fixed to a wrist element 210 of the robot mechanical part 208. The first wire feeder 204a and second wire feeder 204b are connected to the welding torch 202 by the first torch cable 206a and second torch cable 206b to feed a plurality of types (in the illustrated example, two types) of welding wire to the welding torch 202. The first wire feeder 204a and second wire feeder 204b selectively feed the welding wire to the welding torch 202 in accordance with an instruction from a not shown welding controller.

In another arc welding robot, a plurality of sets of welding torches, torch cables, and wire feeders are provided and the welding torches of the sets are adapted to be exchangeably attached to the robot mechanical part by a not shown tool changing means. In this arc welding robot, for example, the welding torch of the set used is fixed to the wrist element of the robot, while the welding torches of the other not used sets are fixed to holding means as connected with the torch cables and wire feeders of their sets. These welding torches can be changed in accordance with need and used for welding.

In a conventional arc welding robot, since a multi-electrode welding torch was fixed to the front end of the robot and the plurality of torch cables and the plurality of wire feeders associated with these torch cables were necessary, there were the problems that the wire feed section was large and could be easily interfered with other peripheral equipment or structures and also the wire feed section was heavy and the load on the robot mechanical part was great.

SUMMARY OF THE INVENTION

An object of the present invention is to eliminate the problems in the prior art and make the wire feeders of an arc welding apparatus smaller and lighter.

To achieve the above object, the present invention provides an arc welding apparatus, which includes a single-electrode type welding torch for using welding wire for welding, a single wire feeder supplied with a plurality of welding wires and having a plurality of wire driving means for driving the plurality of welding wires, and a welding controller for controlling operations of the welding torch and the wire feeder, the welding controller selectively operating any one of the plurality of wire driving means, feeding only a single welding wire by the selected wire driving means to the welding torch, and performing the arc welding.

According to the arc welding apparatus of the present invention, a single wire feeder is provided with a plurality of wire driving means. Therefore, the single wire feeder can selectively feed one of the plurality of welding wires to the welding torch.

In the above arc welding apparatus, it is preferable that each of the plurality of wire driving means includes a drive roller and a driven roller which are opposed to each other and that all of the drive rollers of the plurality of wire driving means are driven by a single motor, and the drive roller and the driven roller of the selected wire driving means are moved relatively to a gripping position where the welding wire is gripped between the drive roller and the driven roller, while the drive roller and the driven roller of each wire driving means other than the selected wire driving means are moved relatively to a separation position where the drive roller and the driven roller separate from each other, so that one of the plurality of wire driving means is selectively operated. It is also possible that each of the plurality of wire driving means include a drive roller and a driven roller which are opposed to each other, and that each of the plurality of wire driving means grips the different welding wire between the drive roller and the driven roller, and a drive shaft of a single motor is selectively engaged with a rotational shaft supporting the drive roller of one of the plurality of wire driving means, thereby selectively operating the drive roller of one of the plurality of wire driving means be selectively operated. By configuring the apparatus in this way, it becomes possible to selectively drive one of the plurality of welding wires by a simple structure.

Preferably, the welding torch and the plurality of wire driving means of the wire feeder are connected by a wire feed path through which the welding wires extend, the wire feed path including a plurality of wire entry paths for receiving welding wires from the plurality of wire driving means, a single wire exit path connected to the welding torch, and a convergence part combining the plurality of wire entry paths and connecting them to the single wire exit path. By connecting the welding torch and the wire feeder by such a wire feed path, it becomes possible to feed only one of the plurality of welding wires to the welding torch by a simple structure.

The present invention further provides an arc welding robot system, which includes the above arc welding apparatus, a robot mechanical part for holding the welding torch of the arc welding apparatus, and a robot controller for controlling operation of the robot mechanical part.

In the above arc welding robot system, the wire feeder of the arc welding apparatus may be provided on the robot mechanical part or may be provided outside the robot mechanical part.

According to the arc welding apparatus and arc welding robot system of the present invention, a single wire feeder can selectively feed one of a plurality of welding wires to a welding torch. Therefore, a wire feed section can be made smaller in size and the possibility of interference with the peripheral equipment can be reduced. Further, since the wire feeder becomes lighter in weight, the load on the robot mechanical part can be reduced.

BRIEF DESCRIPTION OF THE DRAWINGS

These and other objects, features, and advantages of the present invention will be described in more detail below based on preferred embodiments of the present invention with reference to the accompanying drawings, wherein:

FIGS. 1A and 1B are a front view and a right side view of the overall configuration of an industrial use arc welding robot system according to a first embodiment of the present invention;

DESCRIPTION OF THE PREFERRED EMBODIMENTS

Embodiments of the present invention will be described below with reference to the drawings.

Figure 2:
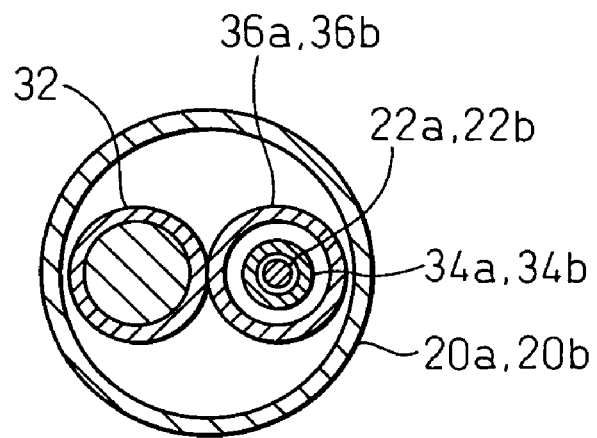
FIG. 2 is a cross-sectional view of a torch cable.

FIGS. 1A and 1B show the overall configuration of an industrial use arc welding robot system 10 according to a first embodiment of the present invention. The arc welding robot system 10 includes an arc welding apparatus 12, a robot mechanical part 14, and a robot controller 16 for controlling the operation of the robot mechanical part 14. The arc welding apparatus 12 includes a welding torch 18, a single wire feeder 24 for selectively feeding one of a plurality of types of welding wires 22a, 22b (see FIGS. 2 and 3) to the welding torch 18 through torch cables 20a, 20b (the selected wire being shown as welding wire 22 in FIGS. 1A and 1B), and a welding controller 26 for controlling the operation of the welding torch 18 and wire feeder 24. The welding torch 18 and the wire feeder 24 are mounted on the robot mechanical part 14.

The robot mechanical part 14 is preferably for example a vertical multi-articulated type and includes a wrist element 142 for holding the welding torch 18, a forearm 144 carrying the wire feeder 24 and having the wrist element 142 at one end, an upper arm 146 connected to the other end of the forearm 144, and a turning base 148 for turning the upper arm 146.

The welding controller 26 is connected to the wire feeder 24 through a connection cable 28 for controlling the operation of the wire feeder 24 and is connected to the robot controller 16 through another connection cable 30 as well for synchronization of the operation of the robot mechanical part 14 and the welding operation. Further, the welding controller 26 includes a built-in welding power source, which is connected to the welding torch 18 by a power cable 32 (see FIG. 2) extending through the insides of the connection cable 28, wire feeder 24, and torch cables 20a, 20b. Due to this configuration, the welding controller 26 controls the operation of the wire feeder 24 and controls the welding current and welding voltage supplied from the welding power source through the power cable 32 to the welding torch 18, in accordance with the operation of the robot mechanical part 14. Although, in the illustrated embodiment, the wire feeder 24 is mounted at the rear of the forearm 144 of the robot mechanical part 14, it may be of course provided at the front part of the forearm 144 or the upper arm 146, turning base 148, or other locations of the robot mechanical part 14. In another embodiment, the wire feeder 24 may also be arranged at the outside of the robot mechanical part 14.

The welding torch 18 is comprised of a single-electrode type welding torch which can receive only a single welding wire. The welding torch 18 and the wire feeder 24 are connected by the torch cables 20a, 20b. As shown in detail in FIG. 2, wire liners 34a, 34b forming wire entry paths of the wire feed path extend inside the torch cables 20a, 20b. The welding wires 22a, 22b are passed through the corresponding wire liners 34a, 34b and fed to the welding torch 18. Further, the torch cables 20a, 20b also function as supply tubes for supplying assist gas used at the time of welding. In more detail, assist gas tubes 36a, 36b are disposed inside the torch cables 20a, 20b so as to surround the wire liners 34a, 34b and thereby form double-layer tube structures. The assist gas flows through the annular spaces between the outer circumferences of the wire liners 34a, 34b and the inner circumferences of the assist gas tubes 36a, 36b. The wire liners 34a, 34b and the assist gas tubes 36a, 36b preferably are arranged concentrically.

Figure 3:
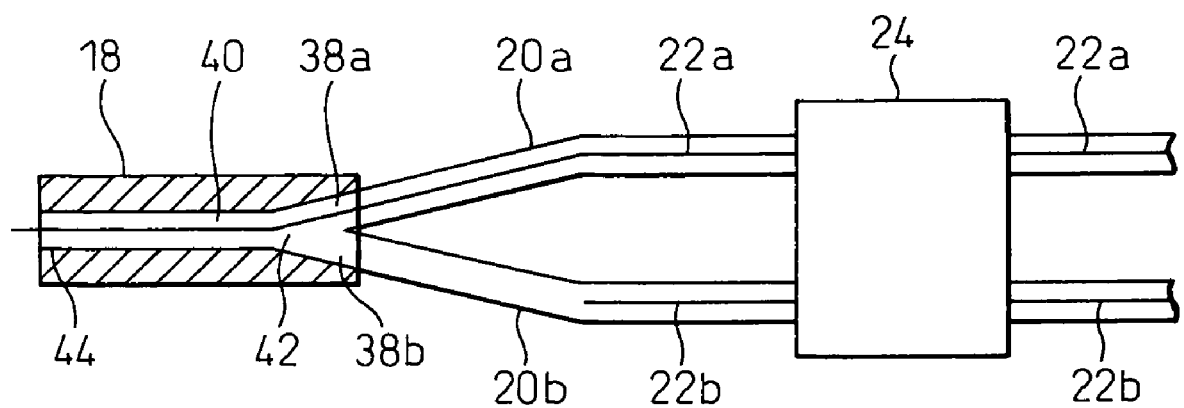
FIG. 3 is a schematic view of the configuration of a welding torch and torch cables used in the arc welding robot system shown in FIGS. 1A and 1B.

As shown in FIG. 3, the rear end (the end at wire feeder side) of the welding torch 18 is formed with a plurality of entry passages 38a, 38b connected to the wire liners 34a, 34b and assist gas tubes 36a, 36b extending passing through the torch cables 20a, 20b and forming parts of the wire entry paths, while the front end of the welding torch 18 is formed with a single exit passage 40 extending from a nozzle opening 44 formed at the front end of the welding torch 18 and forming a wire exit path of the wire feed path. A transition part 42 formed between the entry passages 38a, 38b and the exit passage 40 combines the plurality of entry passages 38a and 38b and connects them to the single exit passage 40. That is, the transition part 42 functions as the convergence part of the plurality of wire entry paths 38a, 38b of the wire feed path. In this way, a single selected welding wire 22a or 22b is passed through the entry passage 38a or 38b, transition part 42, and exit passage 40 and is projected from the nozzle opening 44 for use for welding.

Further, in this embodiment, assist gas supplied through the assist gas tube 36a or 36b flows through the entry passage 38a or 38b, the transition part 42, and the exit passage 40 to be ejected from the nozzle opening 44 for use for welding. Note that, in the above embodiment, the wire liners 34a and 34b extend through the insides of the two torch cables 20a, 20b, but of course the two wire liners liners 34a, 34b may also extend through a single torch cable. In this case, only one torch cable would be necessary. This makes effects that the structure can be simplified and the possibility of interference of the torch cable with the peripheral equipment can be reduced.

Figure 4A:
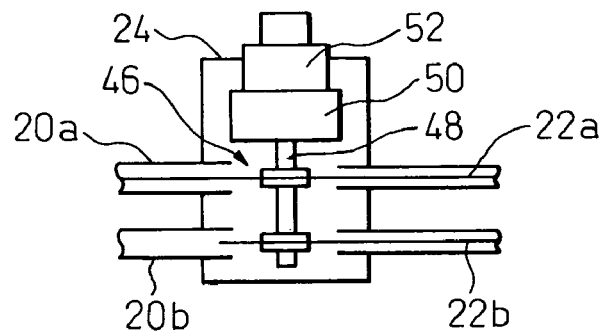
FIGS. 4A and 4B are a horizontal cross-sectional view and side sectional view of the schematic configuration of a wire feeder used in the arc welding robot system shown in FIGS. 1A and 1B.
Figure 4B:
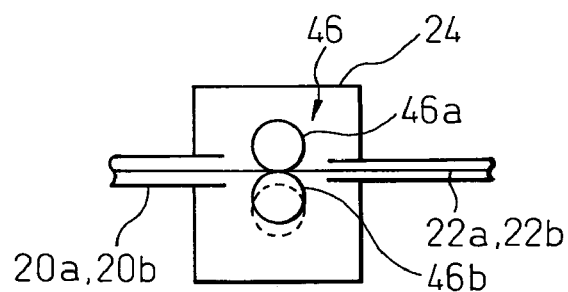
Figure 5:
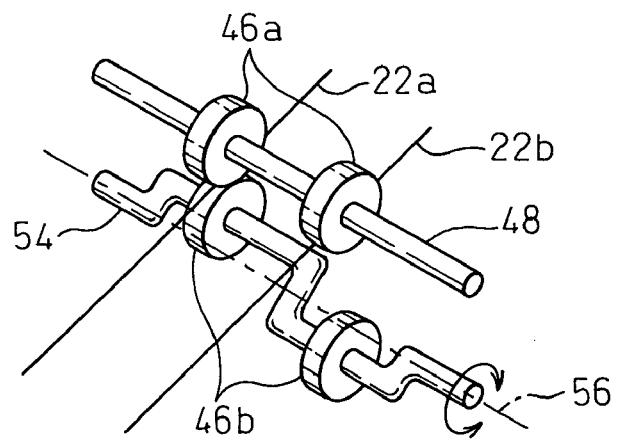
FIG. 5 is a perspective view of an example of a roller drive mechanism of the wire feeder shown in FIGS. 4A and 4B.

The wire feeder 24, as shown in FIGS. 4A and 4B, is supplied with a plurality of types of welding wires 22a, 22b from a plurality of welding wire drums (not shown) and feeds the supplied welding wires 22a, 22b to the wire liners 34a, 34b of the torch cables 20a, 20b connected to the exit side of the wire feeder 24. The wire feeder 24 in this way includes a plurality of sets (in the illustrated example, two sets) of opposed drive rollers 46a and driven rollers 46b as wire driving means 46 for driving and feeding the welding wires 22a, 22b. As shown in FIG. 4B, each of the welding wires 22a, 22b extends between the drive roller 46a and driven roller 46b opposed to each other. As shown in FIG. 5, all of the drive rollers 46a of the plurality of wire driving means 46 are fixed to a single drive shaft 48 and are simultaneously rotated by a single motor 52) connected to the drive shaft 48 by a speed reducer 50. On the other hand, the plurality of driven rollers 46b are all provided to be able to rotate at a single crankshaft 54. This crankshaft 54 is designed to be able to be rotated by an air rotary actuator (not shown) etc.

The driven rollers 46b are arranged around the rotation axis 56 of the crankshaft 54 at equal intervals in the circumferential direction (that is, at equiangular intervals). Therefore, by rotating the crankshaft 54 about its rotation axis 56, the driven roller 46b at only one of the plurality of wire driving means 46 is moved to a gripping position where the drive roller 46a and driven roller 46b come into contact with each other and grip the welding wire 22a or 22b between the rollers, while the driven roller 46b at each of the other wire driving means 46 is moved to a separation position where the drive roller 46a and driven roller 46b are separated from each other by exactly the distance of the diameter of the welding wire 22a or 22b or more. Since the welding wire 22a or 22b between the drive roller 46a and the driven roller 46b at the gripping position is gripped between the two rollers, the welding wire 22a or 22b is driven along with rotation of the drive roller 46ba. On the other hand, since the welding wire 22b or 22a between the drive roller 46a and the driven roller 46b at the separation position is not gripped by the two rollers, the drive force of the drive roller 46a is not transmitted to the welding wire 22b or 22a, and the welding wire 22b or 22a is not driven. Therefore, by controlling the rotational angle of the crankshaft 54 about its rotation axis 56, one of the plurality of wire driving means 46 can be selectively operated.

As shown in FIGS. 4A and 4B, in the case where the wire feeder 24 includes two wire driving means 46, the crankshaft 54 may be formed so that the two driven rollers 46b are arranged at angular intervals of 180 degrees about the rotation axis 56 of the crankshaft 54. Further, in the case where three wire driving means 46 are used, the crankshaft 54 may be formed so that the three driven rollers 46b are arranged at angular intervals of 120 degrees about the rotation axis 56 of the crankshaft 54.

Figure 6:
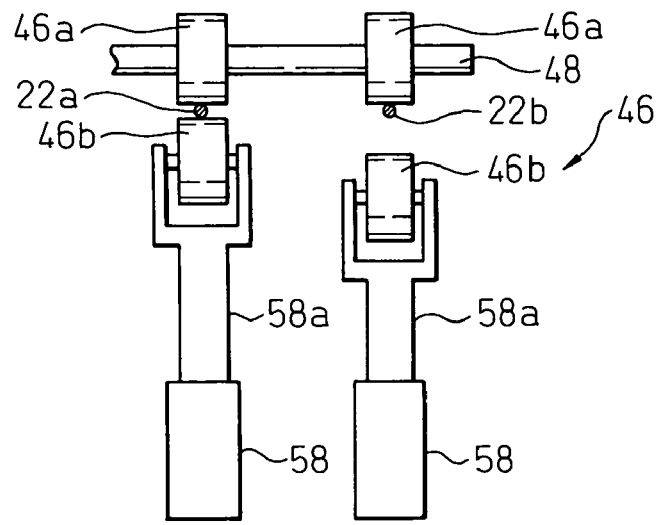
FIG. 6 is a perspective view of another example of a roller drive mechanism of the wire feeder shown in FIGS. 4A and 4B.

In this way, by having a single motor 52 turn all of the drive rollers 46a of the plurality of driving means 46, there is no longer a need to provide each drive roller 46a with a motor. Therefore, the structure can be simplified and the weight can be reduced. Further, since movement of the drive roller 46a and driven roller 46b of each wire driving means 46 between the gripping position and the separation position is performed by a single air rotary actuator etc. (not shown), the increase in complexity of the structure accompanying selective operation of one of the plurality of wire driving means 46 can be kept to a minimum. However, it is of course also possible to provide a plurality of motors and drive the different drive rollers 46a by separate motors. Further, as shown in FIG. 6, it is also possible to move the driven rollers 46b between the gripping position and separation position by separate air cylinders 58. In this case, each driven roller 46b is rotatably supported at the front end of the rod 58a of the air cylinder 58, and the rod 58a is extended or retracted to move the driven roller 46b.

Figure 7A:
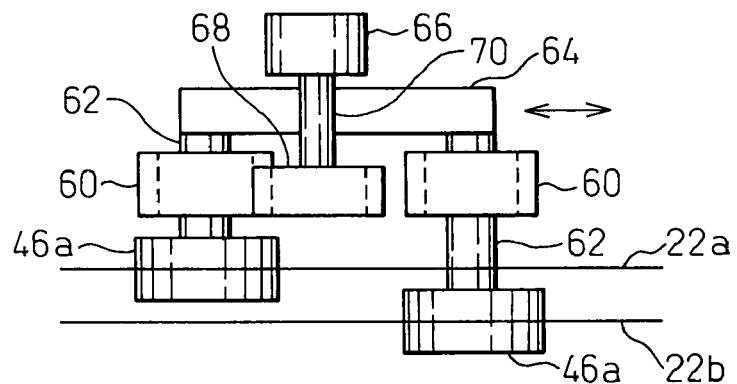
FIGS. 7A and 7B are a plan view and side view of another example of the roller drive mechanism of the wire feeder shown in FIGS. 4A and 4B, in which the driven rollers are omitted.
Figure 7B:
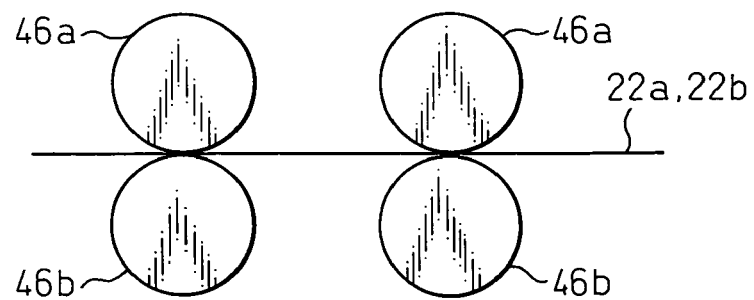

FIGS. 7A and 7B show another embodiment of the wire feeder 24. In this embodiment, two rotational shafts 62 each having a drive roller 46a and gear 60 attached thereto are spaced apart from each other in the feed direction of the welding wires 22a, 22b and are rotatably supported on a movable support member 64. Further, between the two rotational shafts 62, a drive shaft 70 driven by a motor 66 and having a pinion 68 attached thereto is disposed. The two gears 60 and the pinion 68 are aligned in the feed direction of the welding wires 22a, 22b with each other. By using another actuator (not shown) to move the support member 64 forward and backward with respect to the drive shaft 70 in the feed direction of the welding wires 22a, 22b, the gear 60 attached to one of the rotational shafts 62 is engaged with the pinion 68 attached to the drive shaft 70, and the drive roller 46a attached to the rotational shaft 62 to which the gear 60 engaged with the pinion 68 is attached is selectively driven. The driven rollers 46b may be configured as shown in FIG. 5 or FIG. 6. Even if using this configuration, a single motor may be used to selectively operate one of the plurality of wire driving means 46.

Next, using as an example the case of use of a wire feeder of the type shown in FIGS. 4A and 4B or FIG. 5, the welding operation of the welding robot system 10 shown in FIGS. 1A and 1B will be described.

When welding a workpiece, the workpiece to be welded is attached to a welding jig (not shown) located in front of the robot mechanical part 14. In accordance with an instruction from the robot controller 16, the robot mechanical part 14 differentiates the type of the workpiece and cooperates with the welding controller 26 for welding by conditions in accordance with the workpiece. Specifically, the welding controller 26 instructs the wire feeder 24 with the type of the welding wire to be used, the wire feed rate, and the type of the assist gas to be used in accordance with the type of the workpiece and controls the welding current and welding voltage etc. supplied to the welding torch 18. Further, the robot controller 16 controls the operation of the robot mechanical part 14 based on the welding current or welding voltage instructed by the welding controller 26 or other information, to thereby make the welding be performed at a suitable welding rate.

Here, a method of switching the type of the wire used for each type of workpiece in the present invention will be described. A first workpiece and a second workpiece (both not shown) respectively have the welding wire 22a and welding wire 22b designated for them. When the robot mechanical part 14 receives an instruction from the robot controller 16 to weld the first workpiece, it is necessary to feed the welding torch 18 with the welding wire 22a. Therefore, the welding controller 26 outputs an instruction to feed the welding wire 22a to the wire feeder 24. This instruction, as described above, is transmitted through the connection cable 28 to the wire feeder 24. This being the case, the wire feeder 24 selects the wire driving means 46 to be operated and prepares for operation of the selected wire driving means 46. That is, an air rotary actuator etc. is used to turn the crankshaft 54 to make the driven roller 46b of the wire driving means 46 associated with the welding wire 22a to be used approach the drive roller 46a and make the driven roller 46b and the drive roller 46a grip the welding wire 22a. At this time, the driven roller 46b and the drive roller 46a of the wire driving means 46 associated with the welding wire 22b are separated by a distance of at least the diameter of the welding wire 22b.

Next, the motor 52 of the wire feeder 24 is operated to rotate the drive roller 46a and thereby operate the selected wire driving means 46 so as to feed the welding wire 22a to be used to the inside of the wire liner 34a of the corresponding torch cable 20a, pass it through the entry passage 38a, transition part 42, and exit passage 40 of the welding torch 18 connected to the wire liner 34a, and project it from the nozzle opening 44 of the welding torch 18 by exactly a predetermined amount. Note that since the amount of feed is proportional to the amount of rotation of the motor 52 of the wire feeder 24, it can be controlled by monitoring the amount of rotation of the motor 52. Further, when control of the amount of projection of the welding wire 22a from the nozzle opening 44 is difficult, it is also possible to prepare a wire cutter (not shown) near the robot mechanical part 14, use the robot mechanical part 14 to move the welding wire 22a to a predetermined position with respect to the wire cutter, and cut the welding wire 22a by the wire cutter.

Next, the welding controller 26 supplies the instructed welding current or welding voltage through the power cable 32 to the welding torch 18 and at the same time feeds the welding wire 22a at the instructed wire feed rate from the wire feeder 24 to weld the first workpiece using the fed welding wire 22a. At the time of welding, assist gas is simultaneously discharged from the nozzle opening 44 of the welding torch 18 and used for the welding. When the first workpiece finishes being welded, information on the type of the workpiece to be welded next is sent from the robot controller 16 to the robot mechanical part 14 and welding controller 26.

When the workpiece to be welded next is the first workpiece, the same welding wire 22a is used for welding. On the other hand, when the workpiece to be welded next is the second workpiece, the type of the welding wire fed to the welding torch 18 is switched by the following routine before starting the welding. The welding controller 26 first makes the motor 52 of the wire feeder 24 rotate in the direction opposite to that at the time of feed so as to make the wire feeder 24 retract the welding wire 22a from the welding torch 18 to the wire feeder 24 side. At this time, the front end of the welding wire 22a is made to retract to a position beyond the branching point of the transition part 42 at the wire feeder 24 side.

Next, the welding controller 26 outputs an instruction to the wire feeder 24 to feed the welding wire 22b suitable for the second workpiece. This being the case, the wire feeder 24, in the same way as the above, turns the crankshaft 54 so as to make the driven roller 46b of the wire driving means 46 associated with the welding wire 22b to be used approach the drive roller 46a and make the driven roller 46b and the drive roller 46a grip the welding wire 22b. Next, the motor 52 of the wire feeder 24 is operated to rotate the drive roller 46a and thereby operate the selected wire driving means 46 to feed the welding wire 22b to be used to the inside of the wire liner 34b of the corresponding torch cable 20b, pass it through the entry passage 38b, transition part 42, and exit passage 40 of the welding torch 18 connected to the wire liner 34b, and project the welding wire 22b from the nozzle opening 44 of the welding torch 18 by exactly a predetermined amount.

Further, when it is desirable to simultaneously switch the type of the assist gas when switching the type of the welding wire 22a, 22b used, it is possible to provide the wire feeder 24 with solenoid valves (not shown) and have the welding controller 26 control the operation of these solenoid valves to switch the type of the assist gas. When necessary, it is also possible to prepurge the assist gas until the old gas is sufficiently replaced.

Further, the welding controller 26 supplies the instructed welding current or welding voltage through the power cable 32 to the welding torch 18 and at the same time feeds the welding wire 22b at the instructed wire feed rate from the wire feeder 24 to weld the second workpiece using the fed welding wire 22b.

Further, when the workpiece to be processed next is the first workpiece, in the same way as above, the front end of the welding wire 22a corresponding to the first workpiece is retracted to a position beyond the branching point of the transition part 42 of the welding torch 18 at the wire feeder 24 side, then similarly the welding wire 22a corresponding to the first workpiece is fed to the welding torch 18 to perform the welding.

Figure 8B:
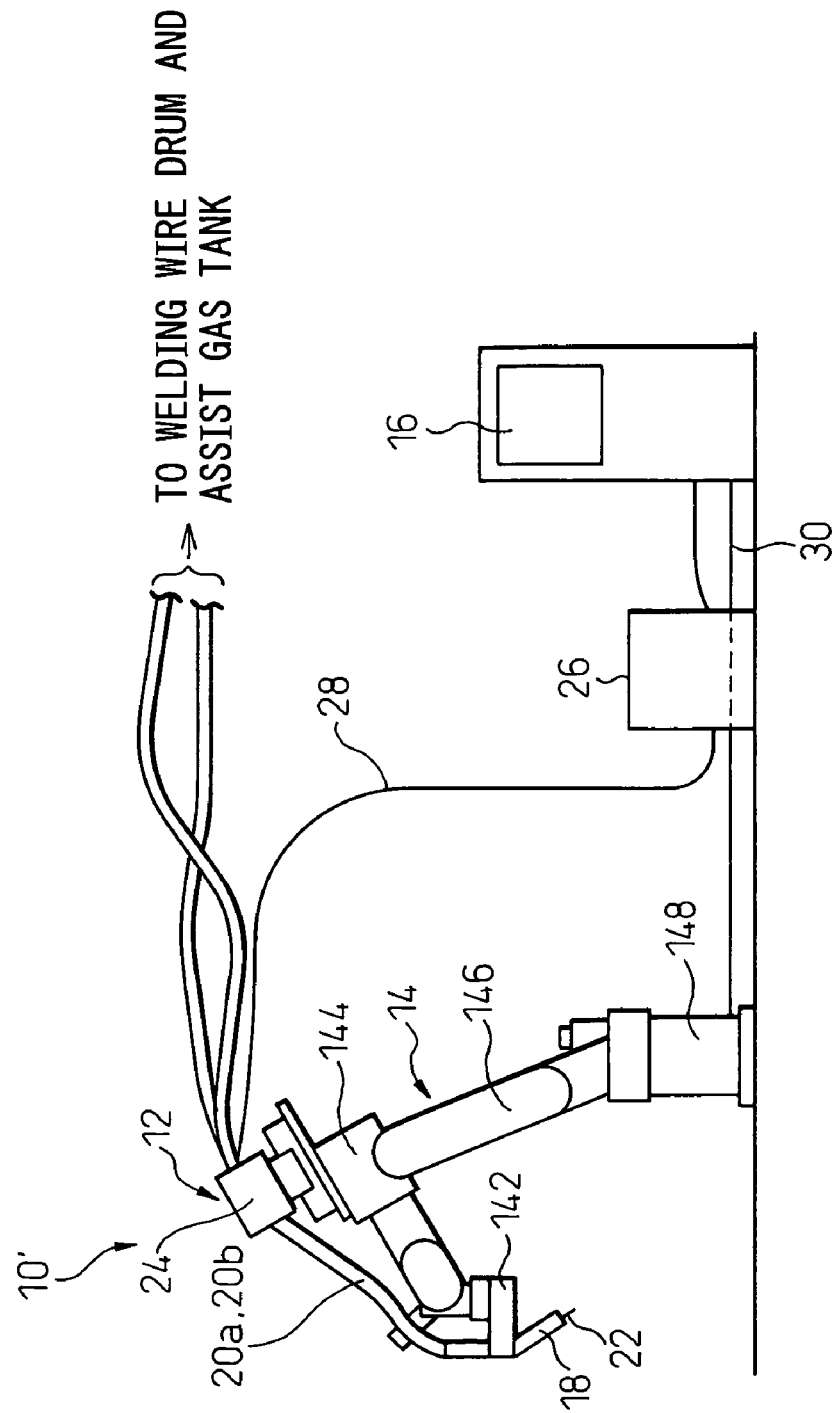
FIGS. 8A and 8B are a front view and a right side view of the overall configuration of an industrial use arc welding robot system according to a second embodiment of the present invention.
Figure 8A:
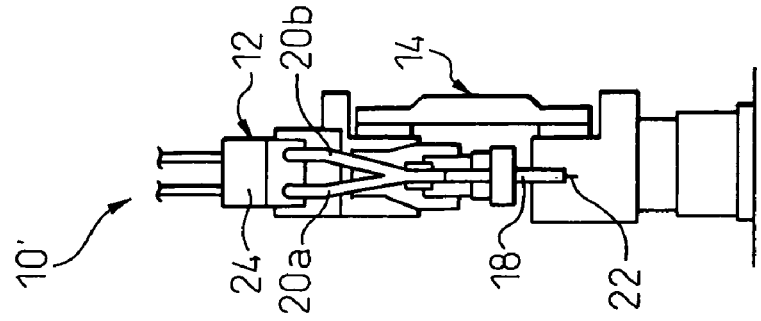

FIGS. 8A and 8B show the overall configuration of an industrial use arc welding robot system 10' according to a second embodiment of the present invention. The arc welding robot system 10' differs from the first embodiment in that the convergence part where the plurality of wire entry paths of the wire feed path converge into one is provided not in the welding torch 72, but in the torch cable 74. As the rest of the configuration is similar to that of the arc welding robot system 10, it will not be described in detail here. Note that in the second embodiment, portions corresponding to the first embodiment are designated by the same reference numerals.

Figure 9:
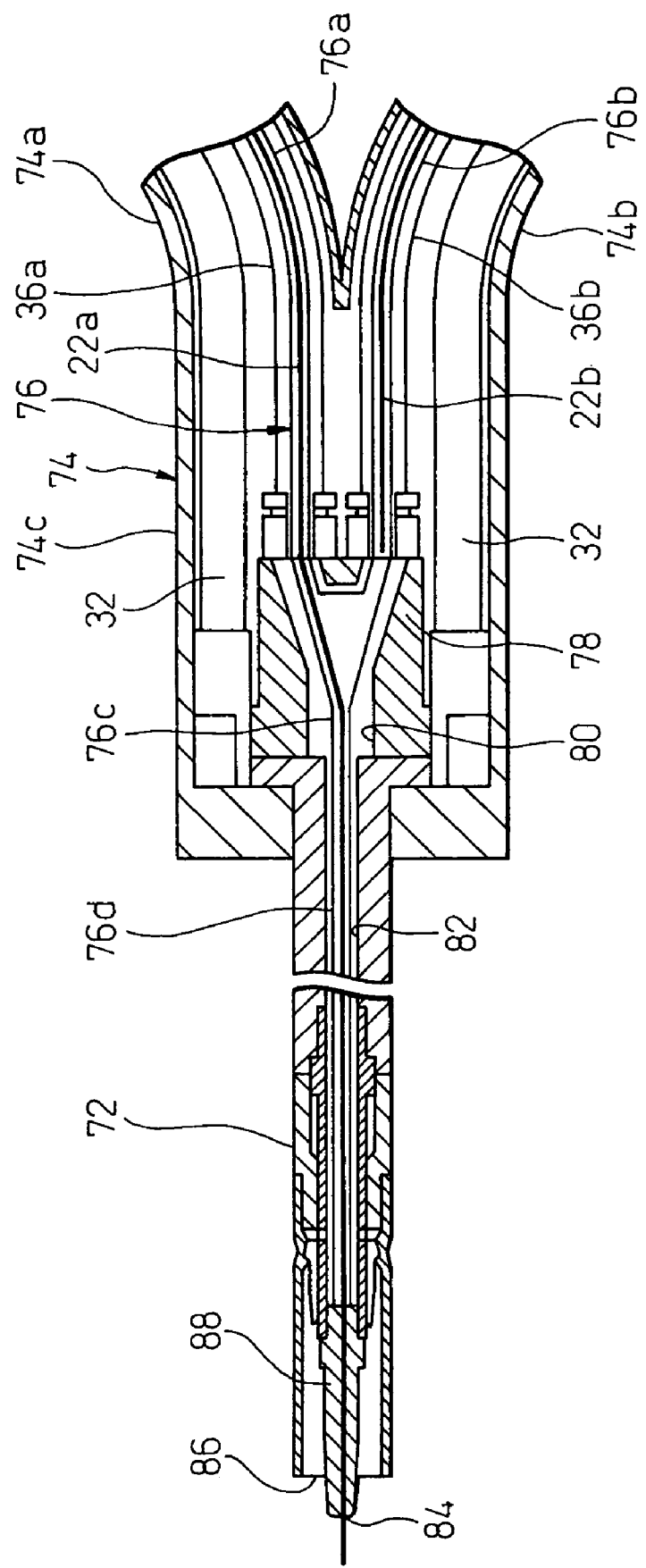
FIG. 9 is a cross-sectional view of the structure of a wire liner convergence part used in the robot system shown in FIGS. 8A and 8B.

Here, with reference to FIG. 9, the structure of the convergence parts 74c, 76c of the torch cable 74 and wire liner 76 will be described in detail. In the second embodiment, the wire entry paths of the wire feed path converge not inside the welding torch 72, but in the region of the torch cable 74. In the illustrated case, a forked, that is, Y-shaped torch cable 74 and wire liner 76 are used to make the two wire entry paths converge and connect them to the wire exit path. More specifically, at the convergence part 74c of the Y-shaped torch cable 74, a relay block 78 formed with a Y-shaped inside passage 80 is provided. Wire liners 76a, 76b extending through the branches 74a and 74b of the torch cable 74 pass through the inside passage 80 of the relay block 78 and, like the inside passage 80, converge in a Y-shape. The now single wire liner 76d further passes through the inside passage 82 formed in the welding torch 72 and is connected to the nozzle opening 84 formed at the front end of the welding torch 72. Further, assist gas tubes 36a, 36b are connected by connectors etc. to the end of the inside passage 80 of the relay block 78 at the wire feeder 24 side so that the assist gas is supplied to the assist gas ejection port 86 at the front end of the welding torch 72 through the space between the inner circumference of the inside passage 80 of the relay block 78 and the inner circumference of the inside passage 82 of the welding torch 72 and the outer circumference of the wire liners 76c, 76d.

In the second embodiment, the parts of the wire liners 76a, 76b up to before the relay block 78 in the torch cable 74 form wire entry paths, the inside passage 80 of the relay block 78 and the wire liner 76c inside it form a convergence part, and the inside passage 82 in the welding torch 72 and the wire liner 76d inside it form a wire exit path.

The welding wires 22a, 22b sent from the wire feeder 24 and passing through the wire liners 76a, 76b inside the torch cables 74a, 74b pass through the wire liners 76c, 76d inside the inside passage 80 of the relay block 78 and the inside passage of the welding torch 72, and project from the nozzle opening 84 for use for welding. On the other hand, assist gas is supplied from a not shown gas supply source, flows through the assist gas tubes 36a, 36b of the torch cables 74, through the space between the inner circumferences of the inside passage 80 of the relay block 78 and the inside passage 82 of the welding torch 72 and the outer circumference of the wire liner, and is discharged from the assist gas ejection port 86 of the welding torch 72 and used for welding.

Here, power cables 32 for supplying the welding current and welding voltage extend along the assist gas tubes 36a, 36b inside the torch cables 74a, 74b and are connected to the relay block 78 functioning also as a power block. The relay block 78 is formed from a conductive material so that power is supplied through this relay block 78 to the welding torch 72. Of course, as described above, it is also possible to combine the power cables into one. Note that, as the wire liner 76 is formed from an insulating material, the welding wires 22a, 22b will not contact the current-carrying welding torch 72 until reaching the tip 88 provided at the nozzle opening 84.

When it is desirable to simultaneously switch the type of the assist gas when switching the type of the welding wire 22a, 22b used, it is possible to provide the wire feeder 24 with solenoid valves (not shown) and control the operation of these solenoid valves to switch the type of the assist gas. When necessary, it is also possible to prepurge the assist gas until the old gas is sufficiently replaced. Since solenoid valves are used, the assist gas will not flow backward, but for further safety, it is also possible to provide a check valve (not shown) at the relay block 78 at the wire feeder side. This enables the time for switching the assist gas to be reduced.

In this arc welding robot system 10', for example, as described in Japanese Unexamined Patent Publication No. 2004-223576, by providing the welding torch 72 so as to be rotatable about an axis spaced apart by a predetermined distance from the rotation axis of the output flange of the wrist element 142 and employing a configuration having a slide mechanism provided at a forearm 144 and movably supporting the torch cable 74 and a tension generating apparatus pulling the slide mechanism in the opposite direction from the work tool, the behavior of the torch cable 74 can be stabilized at the time of welding. The forked torch cable 74 usually is bulky, so sometimes has the problem of interference with peripheral equipment. However, according to the above configuration, even in welding operations where the welding posture greatly changes, there is little movement of the torch cable 74 and welding can be performed without the torch cable 74 interfering with the peripheral equipment.

In the second embodiment, the convergence part 74c of the Y-shaped torch cable 74 is provided adjoining the welding torch 72. This configuration has the advantage, when switching between the types of the welding wires 22a, 22b, of shortening the distance required for retraction of the welding wires 22a, 22b used from the nozzle opening 84 of the welding torch 72 to the convergence part 74c and reducing the time required for switching work. However, the convergence part 74c of the Y-shaped torch cable 74 may also be provided adjoining the wire feeder 24. This configuration has the advantage that the torch cable 74 extending between the wire feeder 24 and the welding torch 72 is a single cable at almost all parts, so the possibility of interference with other peripheral equipment can be reduced.

Figure 10:
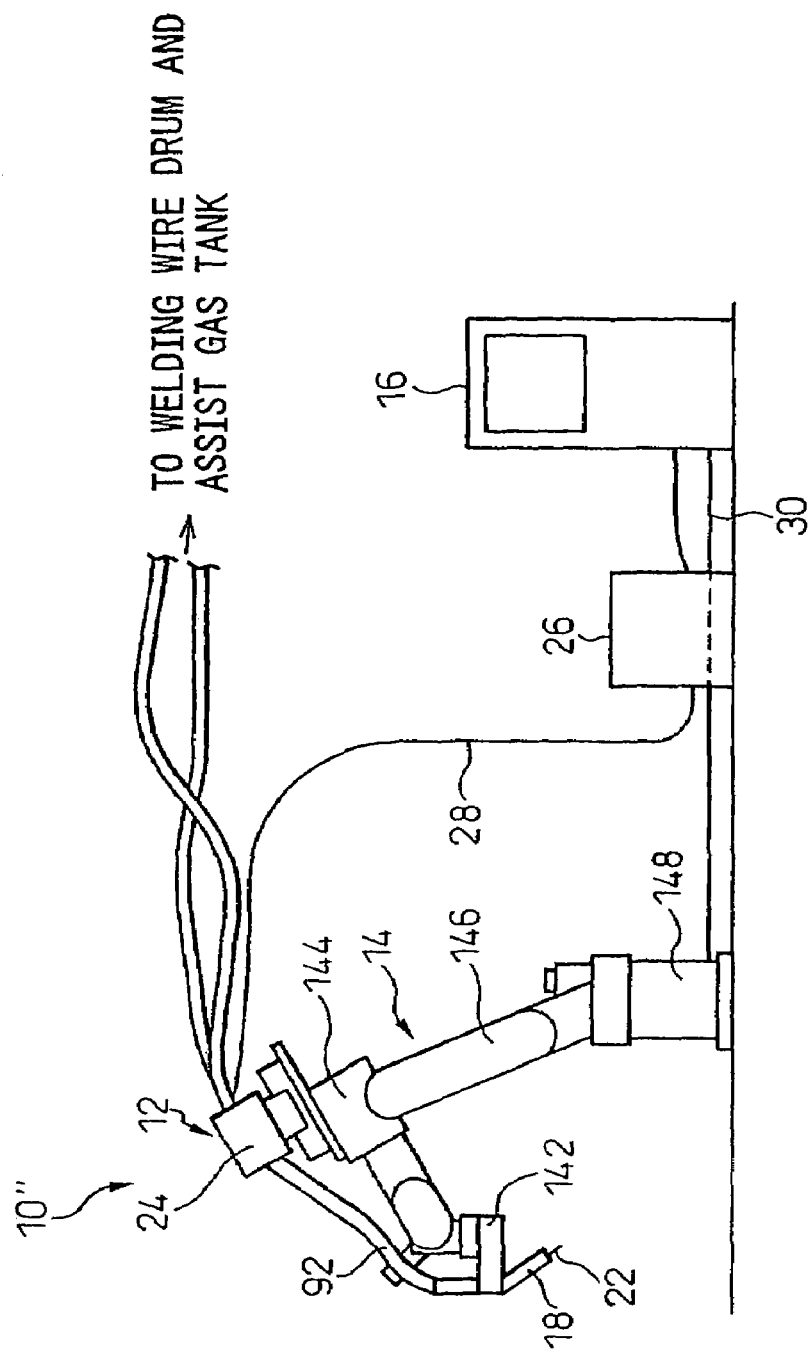
FIGS. 10A and 10B are a front view and a right side view of the overall configuration of an industrial use arc welding robot system according to a third embodiment of the present invention.
Figure 11:
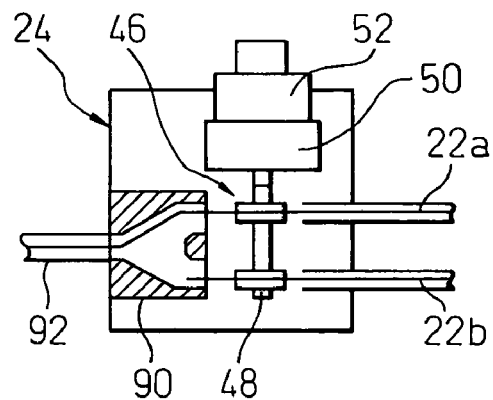
FIG. 11 is a horizontal cross-sectional view of the schematic configuration of a wire feeder used in the arc welding robot system shown in FIGS. 10A and 10B.
Figure 12A:
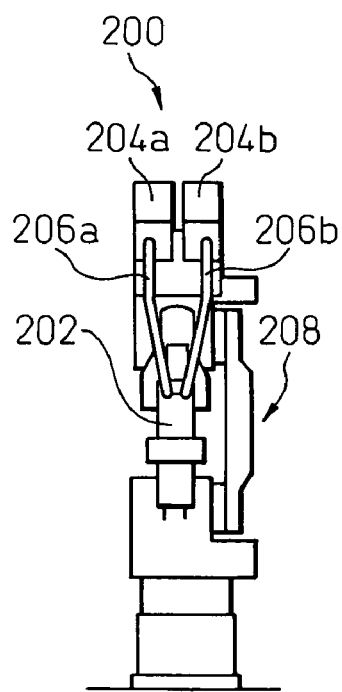
FIGS. 12A and 12B are a front view and a right side view of the overall configuration of a conventional arc welding robot system.
Figure 12B:
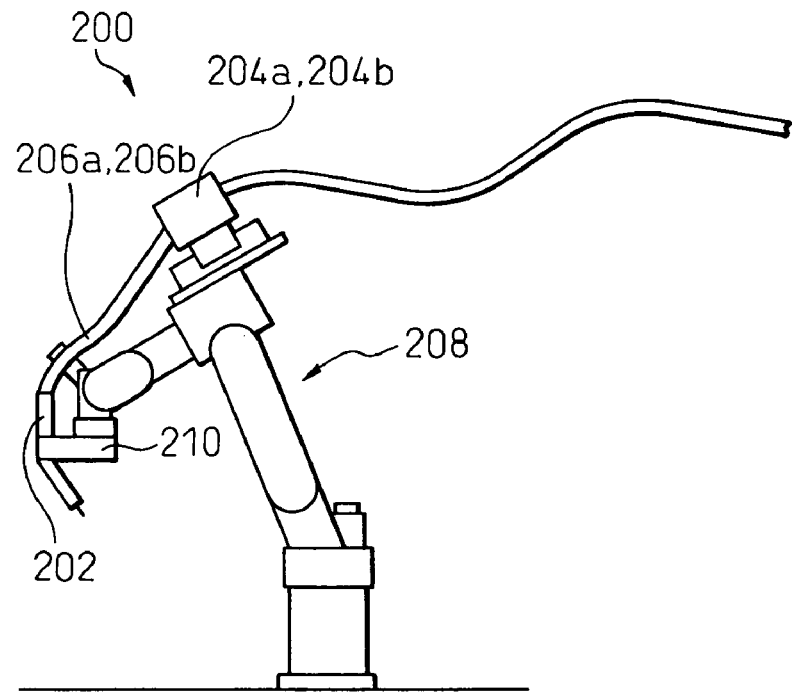

Further, as in an arc welding robot system 10" according to a third embodiment shown in FIGS. 10A, 10B, and 11, it is also possible to provide the convergence part of the wire feed path inside the wire feeder 24 and have only one wire feed path extend from the wire feeder 24. In this case, as shown in FIG. 11, a relay block 90 similar to the relay block 78 of the second embodiment shown in FIG. 9 may be provided at the exit side of the wire driving means 46 of the wire feeder 24. In this third embodiment, the relay block 90 forms the wire entry path and convergence part of the wire feed path, while the wire liner inside the torch cable 92 and the inside passage of the welding torch 72 forms the wire exit path.

While the invention has been described above with reference to specific embodiments shown in the accompanying drawings, these embodiments are only for explanatory and are not limitative. Therefore, the scope of the present invention should be limited only by the claims. The preferred embodiments of the present invention can be modified or changed in any way without departing from the scope of the claims.

What is claimed is:

1. An arc welding apparatus comprising a single-electrode welding torch for using welding wire for welding, a single wire feeder supplied with a plurality of welding wires and having a plurality of wire driving means for driving said plurality of welding wires, and a welding controller for controlling operations of said welding torch and said wire feeder, said welding controller selectively operating any one of said plurality of wire driving means, feeding only a single welding wire by the selected wire driving means to said welding torch to perform arc welding; and wherein:
each of said plurality of wire driving means includes a drive roller and a driven roller which are opposed to each other;
each of said plurality of wire driving means grips a different welding wire between said drive roller and said driven roller; and
said arc welding apparatus further comprises a single motor having a drive shaft which is selectively engaged with a rotational shaft supporting the drive roller of one of said plurality of wire driving means, thereby selectively operating said drive roller of one of said plurality of wire driving means while not operating any other said drive roller of any other of said wire driving means.

2. The arc welding apparatus according to claim 1, wherein all of the drive rollers of said plurality of wire driving means are selectively driven by the single motor, and said drive roller and said driven roller of the selected wire driving means are moved relatively to a gripping position where the welding wire is gripped between said drive roller and said driven roller, while said drive roller and said driven roller of each wire driving means other than said selected wire driving means are moved relatively to a separation position where said drive roller and said driven roller separate from each other, so that one of said plurality of wire driving means is selectively operated.

3. The arc welding apparatus according to claim 1, wherein said welding torch and said plurality of wire driving means of said wire feeder are connected by a wire feed path through which said welding wire extends, said wire feed path including a plurality of wire entry paths for receiving welding wires from said plurality of wire driving means, a single wire exit path connected to said welding torch, and a convergence part combining said plurality of wire entry paths and connecting them to said single wire exit path.

4. An arc welding robot system comprising said arc welding apparatus according to claim 1, a robot mechanical part for holding said welding torch of said arc welding apparatus, and a robot controller for controlling operation of said robot mechanical part.

5. The arc welding robot system according to claim 4, wherein said wire feeder of said arc welding apparatus is provided on said robot mechanical part.

6. The arc welding robot system according to claim 4, wherein said wire feeder of said arc welding apparatus is provided outside said robot mechanical part.

7. The arc welding apparatus according to claim 1, wherein said drive shaft of the single motor has a pinion coupled thereto, that is selectively engaged with the rotational shaft supporting said drive roller of one of said plurality of wire driving means to selectively operate said drive roller of one of said plurality of wire driving means.

8. An arc welding apparatus comprising a single-electrode welding torch for using welding wire for welding, a single wire feeder supplied with a plurality of welding wires and having a plurality of wire driving means for driving said plurality of welding wires, with each of said wire driving means including a driven roller, a drive roller opposed to its said driven roller, a motor for positioning all of said driven rollers, and a welding controller for controlling operations of said welding torch and said wire feeder, said welding controller operating said motor to selectively position one of said driven rollers in a driven position to feed only a single welding wire to said welding torch to perform arc welding;
wherein:
each of said plurality of wire driving means grips a different welding wire between said drive roller and said driven roller; and
said arc welding apparatus further comprises a single motor having a drive shaft which is selectively engaged with a rotational shaft supporting the drive roller of one of said plurality of wire driving means, Thereby selectively operating said drive roller of one of said plurality of wire driving means.

9. The arc welding apparatus according to claim 8, wherein said drive roller and said selectively positioned driven roller are moved relatively to a gripping position where the welding wire is gripped between said drive roller and said driven roller, while said drive roller and said driven roller of each wire driving means other than said selectively positioned driven roller are moved relatively to a separation position where said drive roller and said driven roller separate from each other, so that one of said plurality of wire driving means is selectively operated.

10. The arc welding apparatus according to claim 8, wherein said welding torch and said plurality of wire driving means of said wire feeder are connected by a wire feed path through which said welding wire extends, said wire feed path including a plurality of wire entry paths for receiving welding wires from said plurality of wire driving means, a single wire exit path connected to said welding torch, and a convergence part combining said plurality of wire entry paths and connecting Them to said single wire exit path.

11. An arc welding robot system comprising said arc welding apparatus according to claim 8, a robot mechanical part for holding said welding torch of said arc welding apparatus, and a robot controller for controlling operation of said robot mechanical part.

12. The arc welding robot system according to claim 11, wherein said wire feeder of said arc welding apparatus is provided on said robot mechanical part.

13. The arc welding robot system according to claim 11, wherein said wire feeder of said arc welding apparatus is provided outside said robot mechanical part.

14. The arc welding robot system according to claim 11, further comprising a crankshaft coupled to all of said driven rollers and driven by said motor to selectively position said one of said driven rollers in said driven position while positioning all other of said driven rollers in a non-driven position.

\* \* \* \* \*